(12) United States Patent
Zamir et al.

(10) Patent No.: US 10,990,862 B2
(45) Date of Patent: Apr. 27, 2021

(54) PRINTING ON A WEB OF A PRINTING SUBSTRATE

(71) Applicant: HP INDIGO B.V., Amstelveen (NL)

(72) Inventors: Raz Zamir, Ness Ziona (IL); Moshe Koko Havive, Ness Ziona (IL); Gilad Greenberg, Ness Ziona (IL); Michal Hod, Ness Ziona (IL); Shlomi Ben David, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/603,808

(22) PCT Filed: Apr. 25, 2017

(86) PCT No.: PCT/EP2017/000525
§ 371 (c)(1),
(2) Date: Oct. 8, 2019

(87) PCT Pub. No.: WO2018/196942
PCT Pub. Date: Nov. 1, 2018

(65) Prior Publication Data
US 2020/0042844 A1    Feb. 6, 2020

(51) Int. Cl.
*G06K 15/00* (2006.01)
*G06K 15/02* (2006.01)

(52) U.S. Cl.
CPC ....... *G06K 15/1868* (2013.01); *G06K 15/022* (2013.01); *G06K 15/1898* (2013.01)

(58) Field of Classification Search
CPC ........... G06K 15/1868; G06K 15/1885; G06K 15/022; G06K 15/1898
See application file for complete search history.

(56) References Cited

U.S. PATENT DOCUMENTS

| 5,223,939 | A | 6/1993 | Imaizumi et al. |
| 7,133,149 | B2 | 11/2006 | Keane et al. |

(Continued)

FOREIGN PATENT DOCUMENTS

| EP | 1975774 | 5/1997 |
| EP | 0773498 | 10/2008 |
| WO | WO-2008014242 | 1/2008 |

OTHER PUBLICATIONS

Drupa Stand Highlights: Digital & Wide-format, May 3, 2016, < http://www.printweek.com/print-week/product-news/1157109/drupa-stand-highlights-digital-wide-format >.

*Primary Examiner* — Moustapha Diaby
(74) *Attorney, Agent, or Firm* — Michael A Dryja

(57) ABSTRACT

Method and apparatus for printing on a printing substrate which is a web which is elongate in a longitudinal direction, wherein frames of a maximum printing format can be printed in a sequence on the web. The printing includes arranging a number of pages on sheets of a given sheet format, wherein the maximum printing format is larger in the longitudinal direction of the web than the sheet format, wherein pages which are adjacent in the longitudinal direction of the web are separate from each in the longitudinal direction of the web, imposing pages of more than one sheet into printing frames which are larger in the longitudinal direction of the web than the sheet format but not larger than the maximum printing format, printing the frames, and grouping the pages from the printed frames to sheets on which the pages are arranged as originally.

15 Claims, 6 Drawing Sheets

(56) References Cited

U.S. PATENT DOCUMENTS

| | | |
|---|---|---|
| 7,177,045 B2 | 2/2007 | Goel et al. |
| 7,333,246 B1 * | 2/2008 | Kowalski ............... G06K 15/00 270/41 |
| 7,812,997 B2 | 10/2010 | Morales et al. |
| 8,472,068 B2 | 6/2013 | Kurokawa |
| 9,517,653 B2 | 12/2016 | Sato |
| 2013/0027717 A1 | 1/2013 | Hashimoto |

* cited by examiner

|  300 |
|---|

|  |  |  |  |
|---|---|---|---|
| 13 | 12 | 9 | 16 |
| 4 | 5 | 8 | 1 |

|  |  |  |  |  |
|---|---|---|---|---|
|  |  |  |  |  |
|  |  |  |  |  |

PRINTING ON A WEB OF A PRINTING SUBSTRATE

BACKGROUND

Some types of printers print on a web of a printing substrate which is elongate in a longitudinal direction, wherein successive frames are printed on the web. A number of pages which have a given size can be arranged on a sheet of a given sheet format, and consecutive sheets are printed on the web.

BRIEF DESCRIPTION OF THE DRAWINGS

FIG. 3 is a diagram which shows an example of arranging a number of pages on sheets of a given format;

FIG. 4 is a diagram which shows an example of a printing frame which is larger in the longitudinal direction of the web than the sheet format, and in which more pages than in the example of FIG. 3 are imposed;

FIG. 5 is a diagram which shows an example of imposing pages of more than one sheet of the example of FIG. 3 into printing frames of the example of FIG. 4;

DETAILED DESCRIPTION

Figure 1:
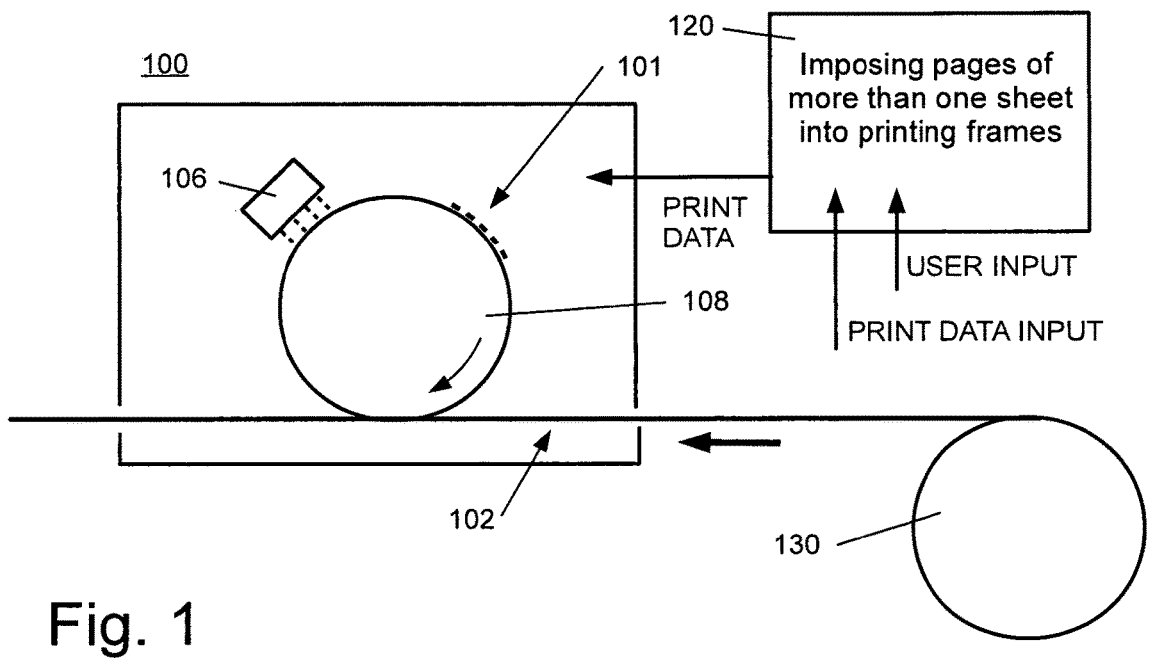
FIG. 1 is a simplified schematic which shows an example of a printing system to print on a web of a printing substrate which is elongate in a longitudinal direction, wherein pages are arranged on sheets, and wherein pages of more than one sheet are imposed into printing frames.

FIG. 1 shows in a simplified schematic diagram an example printing system to print on a web of a printing substrate 102. The printing system of FIG. 1 includes a printer or print engine 100 to print on a web 102 of a printing substrate. The web 102 is elongate in a longitudinal direction, and is fed to pass the printer 100 in the longitudinal direction as shown by the arrow. In examples, the web 102 is a printing substrate which comes from a roll 130 as depicted schematically in FIG. 1.

The printer 100 has a transfer member 108 to print an image 101 on the web 102. In FIG. 1 the transfer member 108 is illustrated as a rotating drum. The image 101 is formed by an imaging device which is represented in a very simplified manner at 106. The transfer member 108 is to print frames of a given maximum format on the web 102. By the transfer member 108 the frames can be printed in a sequence on the web 102. In FIG. 1 the image is formed on the transfer member 108 and printed on the web 102. Instead, the transfer member 108 can be an intermediate transfer member by which the image is transferred from another transfer member (not shown) on which the image is formed by the imaging device 106.

The printing system further includes a control unit 120 which is to process and feed print data to the printer or printing engine 100. The print data are processed from print data input in a manner as commanded by user input, both illustrated by arrows. In an example, the print data input includes sheets of a given sheet format on which pages of a given format are arranged. In an example, as indicated in FIG. 1, commanded by the user's input, and as described later in more detail, in the control unit 120, pages of more than one sheet are imposed into printing frames and output to the printer or print engine 101 and printed in printing frames.

Figure 2:
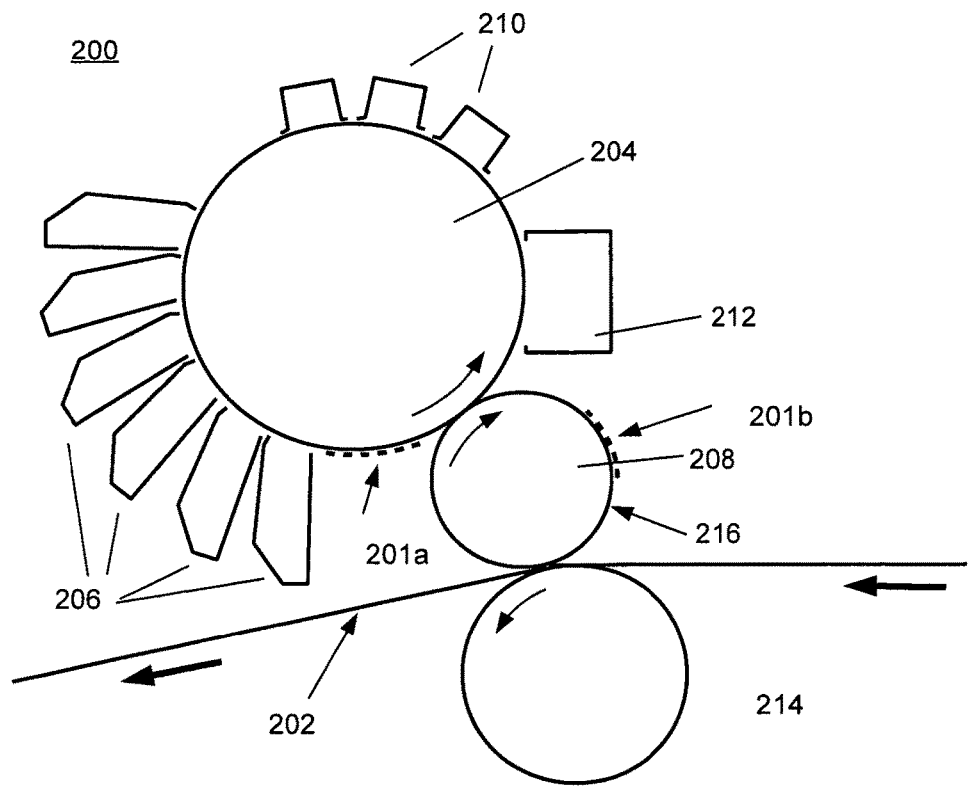
FIG. 2 is a schematic diagram which shows an example printer or print engine to print on a web of a printing substrate.

FIG. 2 illustrates an example printer or print engine 200 to print on a web of a printing substrate 202, similar as shown in the example of FIG. 1. The example of FIG. 2 illustrates a multicolor electrostatic imaging and printing engine or printer 200.

In the example of FIG. 2, a photo imaging plate ("PIP") or photoreceptor on a rotating drum 204 is given a uniform charge by at least one charge unit 210. This uniform charge is selectively discharged to form a latent electrostatic image by a modulated laser beam scanning apparatus, an optical focusing device for imaging a copy on a drum, or another imaging apparatus such as is known in the art, which scans across the PIP 204 as it rotates in the direction shown. The selective discharging on the PIP 204 forms a latent image that corresponds to an image which is to be printed by print engine 200.

Liquid toner is discharged from at least one binary image developer ("BID") 206 which adheres to the appropriately charged areas of PIP 204, thereby developing a latent image 201a. The developed image 201a is first transferred to an intermediate transfer member ("ITM") 208 and heated on the ITM 208, and is then transferred, in a second transfer, as image 201b to a final substrate 202 as described below. A cleaning/discharging unit 212 is to discharge and clean the PIP 204 prior to recharging of PIP 204 in order to start another printing cycle.

As substrate 202 passes by ITM 208, the image 201a located on ITM 208 surface 216 is then transferred and affixed to substrate 202. An impression roller 214 is to improve affixation of the image 201b to substrate 202. Eventually, substrate 202 bearing the image 201b exits the printer. The printer or print engine 200 prints frames in a sequence on the web 102. The frames can be printed in a maximum format which is given by the size of the photo imaging plate ("PIP") or photoreceptor of the rotating drum 204. For printing the frames as a sequence on the web or substrate 202, the substrate 202 is moved forward to take a frame, and is then moved a bit backwards to get prepared for the next frame, so that the frames are adjacent to one another without a gap.

The example print engine 200 of FIG. 2 shows a plurality of BID units 206 located near the PIP 204 to develop the latent image 201a. Typically, each BID 206 contains a different color toner, for use in producing multi-color images. Optionally, BID units 206 are not used for depositing toner on PIP 204, and other development methods and/or other image formation methods, as known in the art, are used.

Multicolor electrostatic imaging and print engines or printers as exemplified schematically in FIG. 2 are part of, e.g. the HP Indigo 50000 Digital Press which is a dual engine press, printing on web or printing substrate 202, wherein a first print engine prints the simplex side and a second print engine prints the duplex side. It should be understood that the foregoing print engine 200 description is provided by way of example only, and that examples of printing on a web of a printing substrate described herein are suitable for use with a variety of print engines, any other web press, single or multi print engine.

Figures 3, 4:
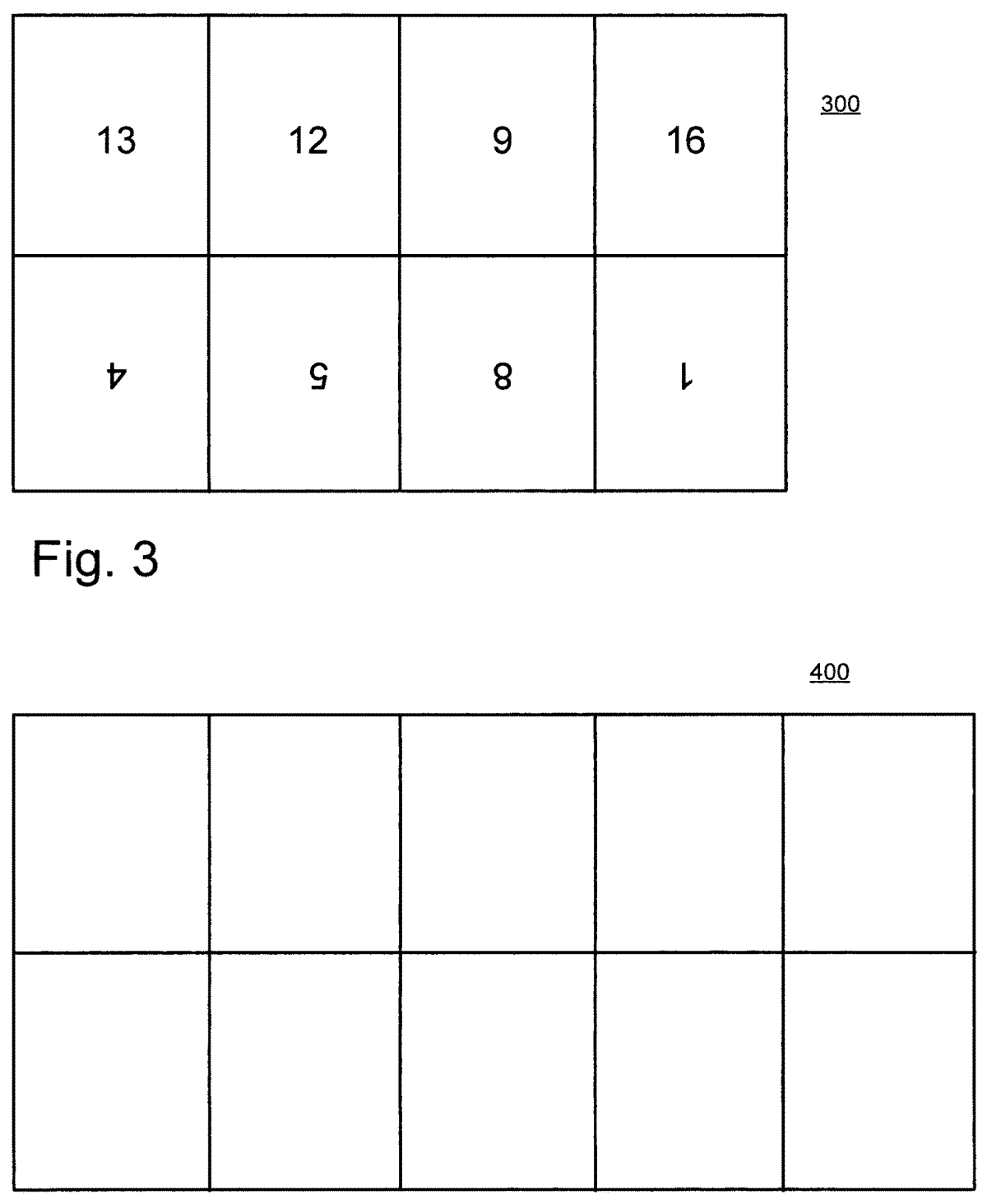

FIG. 3 shows in a diagram an example of arranging a number of eight pages on sheets 300 of a given format. The numbers on the pages correspond to those of a printed product which is achieved by cutting and binding in further processing.

In the example of FIG. 3, the sheet format is assumed to be B1, i.e. 707×1000 mm (27.8×39.4"). On one B1 sheet eight pages of A4 can be arranged, as shown in FIG. 3. On the other hand, in an example the printing format of common print engines, as e.g. the above mentioned HP Indigo 50000, is an oversized B1, often referred to as B1+, of which the measurements are 746×1120 mm (29.37×44.09").

FIG. 4 illustrates in a diagram an example of a printing frame 400 in B1+ format. Due to the oversize measurements of B1+, some of the smaller standard formats, i.e. A4 as shown in FIG. 3, can be imposed additionally to have more images in one oversized B1+. For example, in a standard B1 eight images of A4 can be imposed, but in B1+ ten images of A4 can be imposed on the printing format. Also other formats as A3, B4, B3 and so on can be imposed in larger number on B1+ than on B1.

Even though more images can be imposed in a B1+ printing format 400, in some cases the standard B1 sheet format is better suited to be used in the further processing. For example, if one has to print sheets 300 of eight pages of A4 on B1 as shown in FIG. 3, then ten pages of A4 on a B1+ format, as shown in FIG. 4, will not suit that need.

Figure 5:
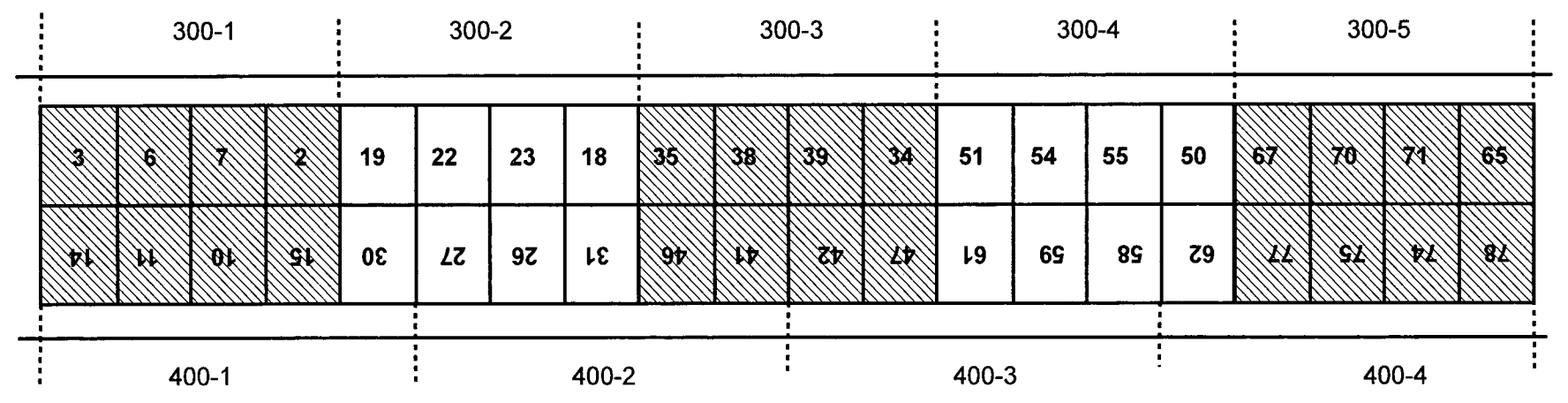

FIG. 5 shows in a diagram an example of imposing pages of more than one sheet 300 of the example B1 sheet format of FIG. 3 into the B1+ format of a printing frame 400 of the example of FIG. 4. Since continues web is used in printing, and the B1 sheets 300 are cut to single pages, ten pages (on each side, if duplex printed) can be imposed on a B1+ printing format 400.

As shown, four pages of A4 format are arranged on each of sheets 300-1, 300-2, . . . in the longitudinal direction of the web 102; 202, and five pages from different, i.e. more than one sheet are imposed into one printing frame 400-1, 400-2, . . . which is larger in (at least) the longitudinal direction of the web (102 202, FIGS. 1 and 2) than the sheets 300-1, 300-2, . . . . Accordingly, four pages are arranged on a sheet 300 in the longitudinal direction of the web (102 202, FIGS. 1 and 2), and five pages from more than one sheet 300 are imposed into one printing frame 400. The printing frame 400 in which the ten pages shown in FIG. 4 are printed is larger in the longitudinal direction of the web (102 202, FIGS. 1 and 2) than the sheet format 300 but not larger than the maximum printing format of the printer or print engine (100 200, FIGS. 1 and 2).

As shown in FIG. 5, instead of printing five sheets 300-1 . . . 300-5 of B1 we print four printing frames 400-1 . . . 400-4 of B1+ and get the same 40 pages of A4. Hence, the printer or print engine and the printing substrate is used more efficiently and with less waste of printing substrate by achieving the same result.

In another example, printing is to produce smaller pages, e.g. postcards. Such an example will be described by FIGS. 6-8.

Figure 6:
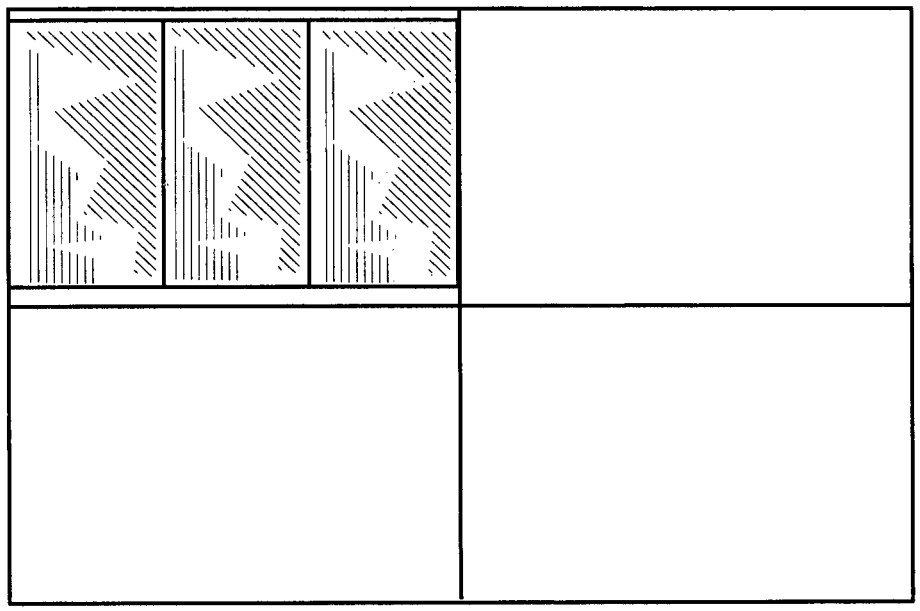
FIG. 6 is a diagram which shows another example of arranging a number of pages on sheets of a given format.

FIG. 6 illustrates an example where three postcards are arranged on a A3 page, and four A3 pages, i.e. twelve postcards (four pages of A3 times three postcards), are arranged on one B1 sheet 500. On a B1+ printing format also four pages of A3 can be printed, which will give us again twelve postcards (four pages of A3 times three postcards). Accordingly, for each of three printing formats of B1+ we get twelve pages of A3 and this gives us 36 postcards.

Figure 7:
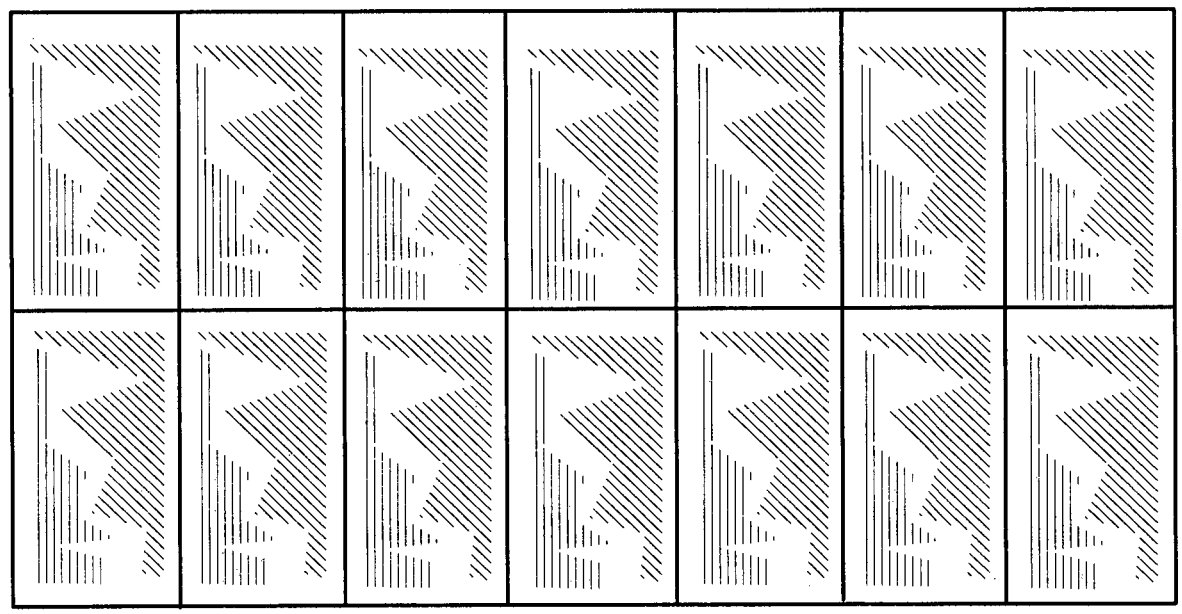
FIG. 7 is a diagram which shows an example of a printing frame which is larger in the longitudinal direction of the web than the sheet format of FIG. 6, and in which more pages than in the example of FIG. 6 are imposed.

However, in one printing format of B1+ we can impose 14 postcards, as shown in FIG. 7 (which corresponds to 4.6 pages of A3). Accordingly, six pages (postcards) are arranged on a sheet 300 in the longitudinal direction of the web (102 202, FIGS. 1 and 2), and seven pages (postcards) from more than one sheet 300 are imposed into one printing frame 400. The printing frame 400 in which the 14 postcards illustrated in FIG. 7 are printed is larger in the longitudinal direction of the web (102 202, FIGS. 1 and 2) than the sheet format but not larger than the maximum printing format of the printer or print engine (100 200, FIGS. 1 and 2).

Figure 8:
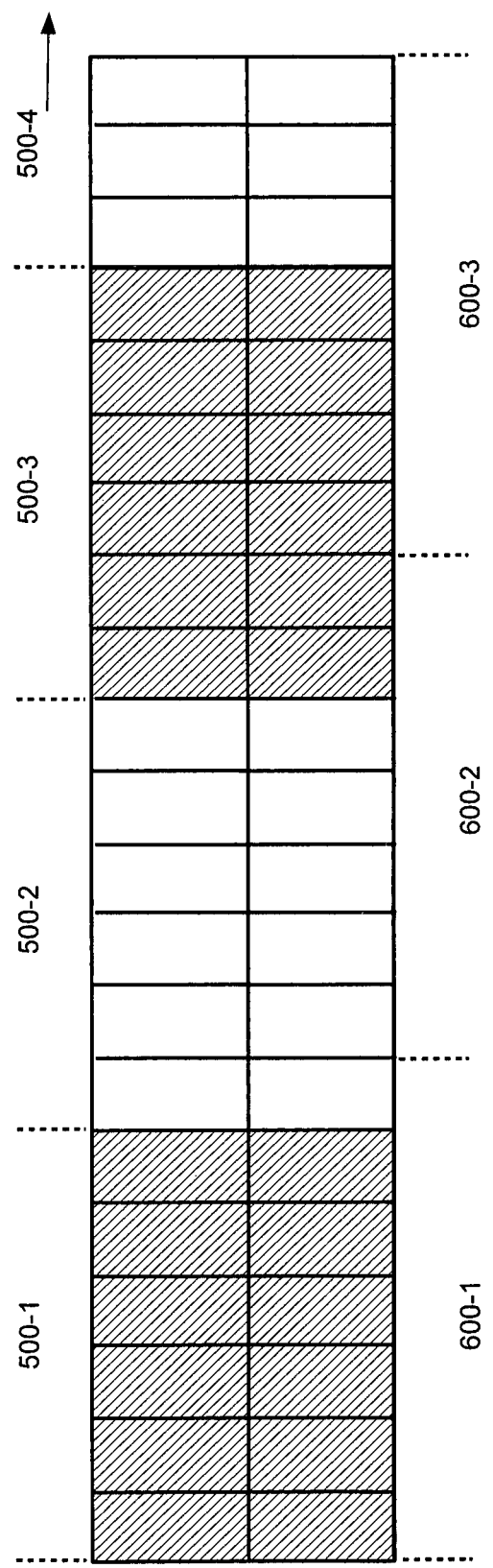
FIG. 8 is a diagram which shows an example of imposing pages of more than one sheet of the example of FIG. 6 into printing frames of the example of FIG. 7.

As shown in FIG. 8, instead of printing three and a half sheets 500-1, 500-2, 500-3, 500-4 of B1 we print three printing frames 600-1, 600-2, 600-3 of B1+ and get 42 postcards which corresponds to 14 pages of A3.

Figure 9:
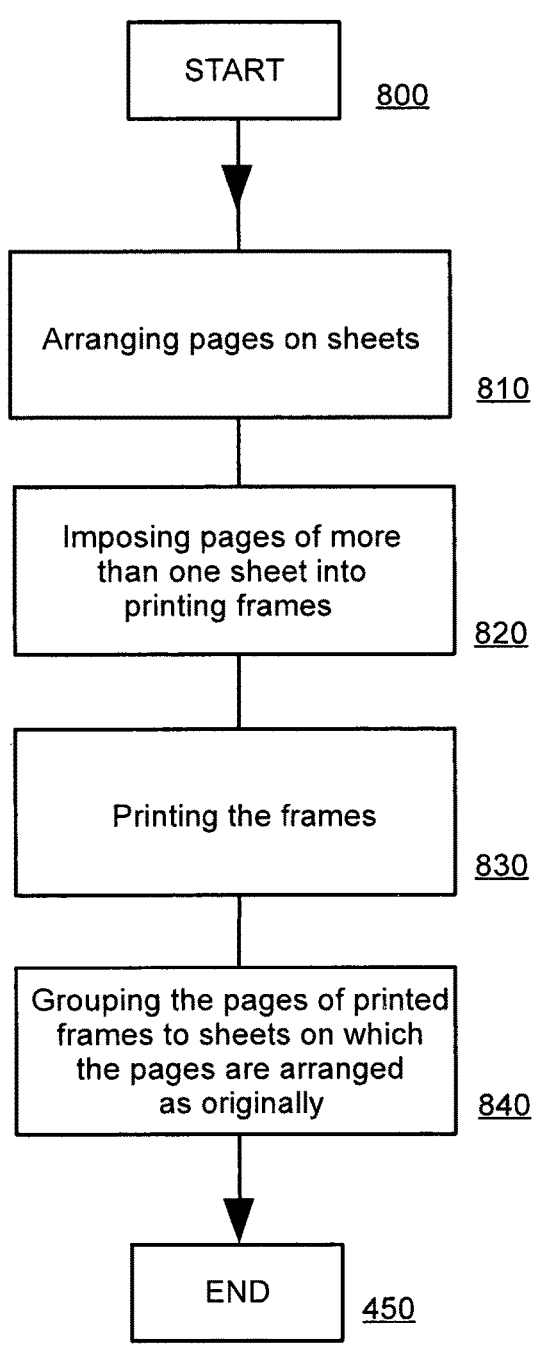
FIG. 9 is a block diagram which shows an example of printing on a web of a printing substrate.
Figure 10:
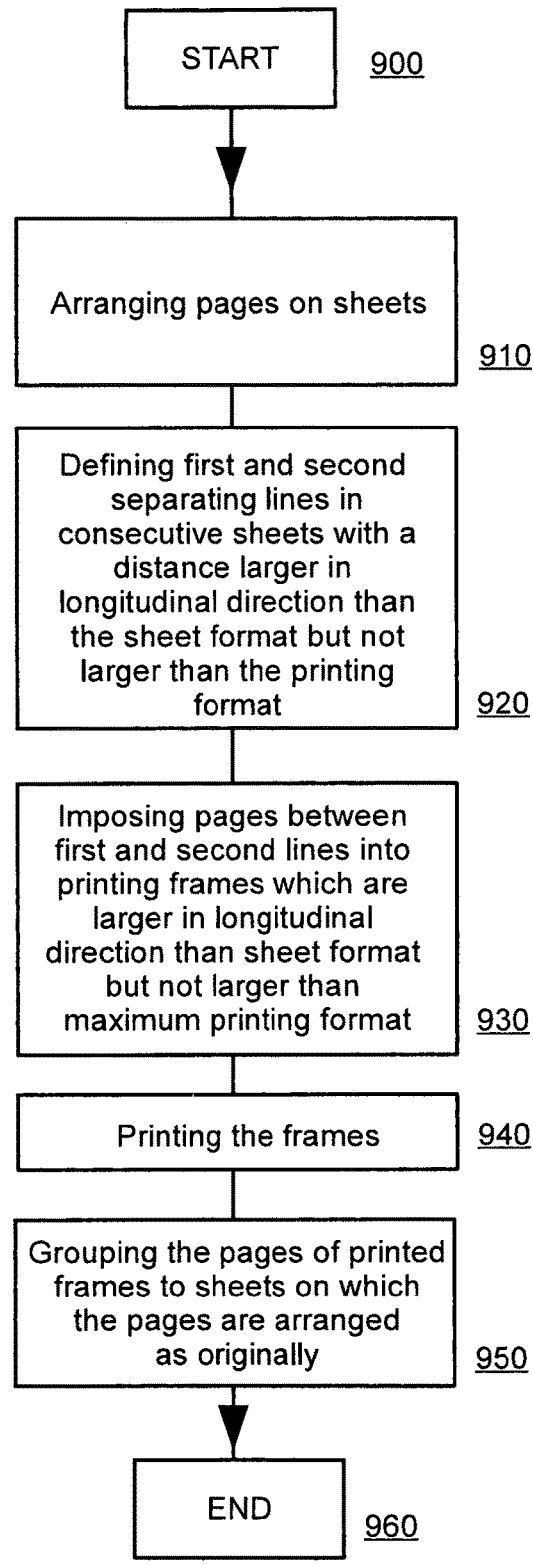
FIG. 10 is a block diagram which shows another example of printing on a web of a printing substrate.

Now, referring to FIGS. 9 and 10, example methods of printing on a web (102 202, FIGS. 1 and 2) of a printing substrate which is in a longitudinal direction is described.

As explained above with reference to FIGS. 1 and 2, it is assumed that frames (400 600, FIGS. 4 and 7) of a given maximum format can be printed in a sequence on the web (102 202, FIGS. 1 and 2). Printing is to produce a number of pages on sheets (300 500, FIGS. 3 and 6) of a given format, wherein the frame format is larger in (at least) the longitudinal direction of the web than the sheet format. In the sheets (300 500, FIGS. 3 and 6) pages which are adjacent in the longitudinal direction of the web (102 202, FIGS. 1 and 2) are separate from each in the longitudinal direction of the web. That means, pages which are arranged in a sheet (300 500, FIGS. 3 and 6) and which are adjacent in the longitudinal direction of the web (102 202, FIGS. 1 and 2) are separated from each other by (virtual or visual) separating lines normal to the longitudinal direction of the web (102 202, FIGS. 1 and 2). Accordingly, the pages of the sheets (300 500, FIGS. 3 and 6) of the given format are imposed between first and second lines into printing, frames (400 600, FIGS. 4 and 7) which are larger in the longitudinal direction of the web than the sheet format but not larger than the maximum printing format of the printer or print engine (100 200, FIGS. 1 and 2).

In the example of FIG. 9, after start at 800, at 810 a number of pages are arranged on sheets (300 500, FIGS. 3 and 6). At 820 pages of more than one sheet (300 500, FIGS. 3 and 6) are imposed into printing frames (400 600, FIGS. 4 and 7). The printing frames (400 600, FIGS. 4 and 7) are larger in the longitudinal direction of the web (102 202, FIGS. 1 and 2) than the sheet format but not larger than the maximum possible printing format. At 830 the frames are printed. Next, 840 includes grouping the pages from the printed frames (400 600, FIGS. 4 and 7) to sheets (300 500, FIGS. 3 and 6) on which the pages are arranged as originally.

In the example of FIG. 10, after start at 900, at 910 a number of pages are arranged on sheets (300 500, FIGS. 3 and 6). Next, 920 includes defining first and second separating lines normal to the longitudinal direction of the web (102 202, FIGS. 1 and 2) and in consecutive sheets (300 500, FIGS. 3 and 6), which have a distance in the longitudinal direction of the web (102 202, FIGS. 1 and 2) which is larger than the sheet format but not larger than the printing format. At 930 pages of more than one sheet (300 500, FIGS. 3 and 6) are imposed into printing frames (400 600, FIGS. 4 and 7). The printing frames (400 600, FIGS. 4 and 7) are larger in the longitudinal direction of the web (102 202, FIGS. 1 and 2) than the sheet format but not larger than the maximum possible printing format. These pages are imposed into the printing frames between the first and second lines. At 940 the frames are printed. Next, 950 includes grouping the pages from the printed frames (400 600, FIGS. 4 and 7) to sheets (300 500, FIGS. 3 and 6) on which the pages are arranged as originally.

Described more generally, the pages which are arranged on the sheets (300 500, FIGS. 3 and 6) have a given size in the longitudinal direction of the web (102 202, FIGS. 1 and 2), wherein an integer number M of pages are arranged on a sheet (300 500, FIGS. 3 and 6) in the longitudinal direction of the web. An integer number N of pages from more than one sheet (300 500, FIGS. 3 and 6), N being larger than M, are imposed into one printing frame (400 600, FIGS. 4 and 7) which is larger in the longitudinal direction of the web (102 202, FIGS. 1 and 2) than the sheet format but not larger than the maximum printing format of the printer or print engine (100 200, FIGS. 1 and 2).

In an example grouping the pages from the printed frames 400; 600 to sheets (300 500, FIGS. 3 and 6) as the pages are arranged originally, includes adding cutting marks to the printed pages which correspond to the sheets (300 500, FIGS. 3 and 6) so that the pages of one sheet are arranged between the cutting marks as originally. Accordingly, the cutting marks separate one sheet (300 500, FIGS. 3 and 6) from the next.

Now, referring back to FIG. 1, in an example, the control unit 120 of the printing system is to process print data to arrange a number of pages on sheets (300 500, FIGS. 3 and 6) of a given format. The frame format of the printer is larger in (at least) the longitudinal direction of the web (102 202, FIGS. 1 and 2) than the sheet format. Pages which are adjacent in the longitudinal direction of the web (102 202, FIGS. 1 and 2) are separate from each in the longitudinal direction of the web (102 202, FIGS. 1 and 2).

The controller 120 is to impose pages of more than one sheet (300 500, FIGS. 3 and 6) into printing frames (400 600, FIGS. 4 and 7) which are larger in the longitudinal direction of the web (102 202, FIGS. 1 and 2) than the sheet format but not larger than the maximum printing format of the printer or print engine 100; 200. The controller 120 is further to send frame data corresponding to the printing frames (400 600, FIGS. 4 and 7) to the printer or print engine (100 200, FIGS. 1 and 2) to print the frames (400 600, FIGS. 4 and 7) of the imposed pages, and to group the pages from the printed frames (400 600, FIGS. 4 and 7) to sheets on which the pages are arranged as on the original sheets (300 500, FIGS. 3 and 6).

In another example, the control unit 120 of the printing system is to process the print data to arrange pages of a given size are in the form of sheets (300 500, FIGS. 3 and 6) of a given format, wherein pages which are arranged in a sheet sheets (300 500, FIGS. 3 and 6) and which are adjacent in the longitudinal direction of the web are separated from each other by (virtual or visual) separating lines which are normal to the longitudinal direction of the web (102 202, FIGS. 1 and 2). Further, in the example, the control unit 120 is to define first and second separating lines normal to the longitudinal direction of the web (102 202, FIGS. 1 and 2) and in consecutive sheets (300 500, FIGS. 3 and 6), which have a distance in the longitudinal direction of the web (102 202, FIGS. 1 and 2) which is larger than the sheet format but not larger than the printing format, and to impose the pages between the first and second lines into printing frames (400 600, FIGS. 4 and 7) which are larger in the longitudinal direction of the web (102 202, FIGS. 1 and 2) than the sheet format but not larger than the maximum printing format of the printer or print engine (100 200, FIGS. 1 and 2).

In another example, the control unit 120 of the printing system is to insert cutting marks into the print data to group the pages from the printed frames (400 600, FIGS. 4 and 7) as arranged in the original sheets (300 500, FIGS. 3 and 6).

In still another example, the control unit 120 of the printing system is to arrange two or more pages which are adjacent in the direction normal to the longitudinal direction of the web (102 202, FIGS. 1 and 2), wherein pages which are adjacent in the longitudinal direction of the web (102 202, FIGS. 1 and 2) are separated from each other by separating lines normal to the longitudinal direction of the web (102 202, FIGS. 1 and 2), to define first and second separating lines normal to the longitudinal direction of the web (102 202, FIGS. 1 and 2) and in consecutive sheets (300 500, FIGS. 3 and 6), and which have a distance in the longitudinal direction of the web (102 202, FIGS. 1 and 2) which is larger than the sheet format but not larger than the printing format of the printer or print engine (100 200, FIGS. 1 and 2).

In another example, the control unit 120 of the printing system is to impose the pages between the first and second lines into printing frames (400 600, FIGS. 4 and 7) which are larger in the longitudinal direction of the web (102 202, FIGS. 1 and 2) than the sheet format but not larger than the maximum printing format, wherein the pages which are arranged on the sheets (300 500, FIGS. 3 and 6) have a given size in the longitudinal direction of the web (102 202, FIGS. 1 and 2), wherein an integer number M of pages are arranged on a sheet (300 500, FIGS. 3 and 6) in the longitudinal direction of the web (102 202, FIGS. 1 and 2), and wherein an integer number N of pages from more than one sheet (300 500, FIGS. 3 and 6), N being larger than M, are imposed into one printing frame (400 600, FIGS. 4 and 7) which is larger in the longitudinal direction of the web (102 202, FIGS. 1 and 2) than the sheet format but not larger than the maximum printing format of the printer or print engine (100 200, FIGS. 1 and 2).

The control unit 120 processes print data by software which is, per se, known in the art. Hence, in examples, input of commands to the control unit 120 is by a user in a manner as usual in the art.

In an example, the frames 400; 600 printed on the web (102 202, FIGS. 1 and 2) have oversized B1 format (B+), and the sheets (300 500, FIGS. 3 and 6) on which the pages are arranged have B1 format.

What is claimed is:
1. A method of printing, comprising
   printing on a printing substrate which is a web which is elongate in a longitudinal direction, wherein frames of a maximum printing format can be printed in a sequence on the web,
   arranging a plurality of pages on each of a plurality of sheets of a given sheet format, wherein the maximum printing format is larger in the longitudinal direction of the web than the sheet format, wherein pages which are adjacent in the longitudinal direction of the web are separate from each in the longitudinal direction of the web,
   imposing pages of more than one sheet into printing frames which are larger in the longitudinal direction of the web than the sheet format but not larger than the maximum printing format,
   printing the frames, grouping the pages from the printed frames to sheets on which the pages are arranged as originally.

2. The method of claim 1, wherein pages of a given size are arranged in the form of sheets of a given format, and wherein pages which are arranged in a sheet and which are adjacent in the longitudinal direction of the web are separated from each other by separating lines normal to the longitudinal direction of the web, and comprising defining first and second separating lines normal to the longitudinal direction of the web and in consecutive sheets, which have a distance in the longitudinal direction of the web which is larger than the sheet format but not larger than the maximum printing format, imposing the pages between the first and second lines into printing frames which are larger in the longitudinal direction of the web than the sheet format but not larger than the maximum printing format.

3. The method of claim 1, wherein grouping the pages from the printed frames to sheets as arranged originally includes adding cutting marks to the printed pages which correspond to the sheets as arranged originally.

4. The method of claim 1, wherein two or more pages are arranged adjacent in the direction normal to the longitudinal direction of the web, and wherein pages which are adjacent in the longitudinal direction of the web are separate from each in the longitudinal direction of the web.

5. The method of claim 1, wherein two or more pages are arranged adjacent in the direction normal to the longitudinal direction of the web, and wherein pages which are adjacent in the longitudinal direction of the web are separated from each other by separating lines normal to the longitudinal direction of the web, and comprising defining first and second separating lines normal to the longitudinal direction of the web and in consecutive sheets, which have a distance in the longitudinal direction of the web which is larger than the sheet format but not larger than the maximum printing format, imposing the pages between the first and second lines into printing frames which are larger in the longitudinal direction of the web than the sheet format but not larger than the maximum printing format.

6. The method of claim 1, wherein the pages which are arranged on the sheets have a given size in the longitudinal direction of the web, wherein an integer number M of pages are arranged on a sheet in the longitudinal direction of the web, and wherein an integer number N of pages from more than one sheet, N being larger than M, are imposed into one printing frame which is larger in the longitudinal direction of the web than the sheet format but not larger than the maximum printing format.

7. The method of claim 1, wherein the pages which are arranged on the sheets have a given size in the longitudinal direction of the web, wherein four pages are arranged on a sheet in the longitudinal direction of the web, and wherein five pages from more than one sheet are imposed into one printing frame which is larger in the longitudinal direction of the web than the sheet format but not larger than the maximum printing format.

8. The method of claim 1, wherein the pages which are arranged on the sheets have a given size in the longitudinal direction of the web, wherein six pages are arranged on a sheet in the longitudinal direction of the web, and wherein seven pages from more than one sheet are imposed into one printing frame which is larger in the longitudinal direction of the web than the sheet format but not larger than the maximum printing format.

9. The method of claim 1, wherein the frames printed on the web have oversized B1 format (B+), and the sheets on which the pages are arranged have B1 format.

10. A printing system which comprises a printer to print on a printing substrate which is a web which is elongate in a longitudinal direction, wherein frames of a maximum printing format can be printed in a sequence on the web, and a control unit which is to process print data to arrange a plurality of pages on each of a plurality of sheets of a given sheet format, wherein the maximum printing format of the printer is larger in the longitudinal direction of the web than the sheet format, wherein pages which are adjacent in the longitudinal direction of the web are separate from each in the longitudinal direction of the web, to impose pages of more than one sheet into printing frames which are larger in the longitudinal direction of the web than the sheet format but not larger than the maximum printing format, to send frame data corresponding to the printing frames to the printer to print the frames of the imposed pages, and to group the pages from the printed frames to sheets on which the pages are arranged as originally.

11. The printing system of claim 10, wherein the control unit is to process the print data to arrange pages of a given size are in the form of sheets of the given sheet format, wherein pages which are arranged in a sheet and which are adjacent in the longitudinal direction of the web are separated from each other by separating lines normal to the longitudinal direction of the web, to define first and second separating lines normal to the longitudinal direction of the web and in consecutive sheets, which have a distance in the longitudinal direction of the web which is larger than the sheet format but not larger than the maximum printing format, and to impose the pages between the first and second lines into printing frames which are larger in the longitudinal direction of the web than the sheet format but not larger than the maximum printing format.

12. The printing system of claim 10, wherein the control unit is to insert cutting marks into the print data to group the pages from the printed frames to sheets as arranged originally.

13. The printing system of claim 10, wherein the control unit is to arrange two or more pages adjacent in the direction normal to the longitudinal direction of the web, wherein pages which are adjacent in the longitudinal direction of the web are separated from each other by separating lines normal to the longitudinal direction of the web, to define first and second separating lines normal to the longitudinal direction of the web and in consecutive sheets, which have a distance in the longitudinal direction of the web which is larger than the sheet format but not larger than the maximum printing format, to impose the pages between the first and second lines into printing frames which are larger in the longitudinal direction of the web than the sheet format but not larger than the maximum printing format, wherein the pages which are arranged on the sheets have a given size in the longitudinal direction of the web, wherein an integer number M of pages are arranged on a sheet in the longitudinal direction of the web, and wherein an integer number N of pages from more than one sheet, N being larger than M, are imposed into one printing frame which is larger in the longitudinal direction of the web than the sheet format but not larger than the maximum printing format.

14. The printing system of claim 10, wherein the frames printed on the web have oversized B1 format (B+), and the sheets on which the pages are arranged have B1 format.

15. Use of a printing system which comprises
a printer to print on a printing substrate which is a web which is elongate in a longitudinal direction, wherein frames of a maximum printing format can be printed in a sequence on the web, and a control unit which is to process print data, wherein
a number of pages are arranged on sheets of a given sheet format, wherein the maximum printing format of the printer is larger in the longitudinal direction of the web than the sheet format, wherein pages which are adjacent in the longitudinal direction of the web are separate from each in the longitudinal direction of the web,
pages of more than one sheet are imposed into printing frames which are larger in the longitudinal direction of the web than the sheet format but not larger than the maximum printing format,
frame data corresponding to the printing frames are sent to the printer to print the frames of the imposed pages,
the pages from the printed frames are grouped to sheets on which the pages are arranged as originally,
wherein the pages which are arranged on the sheets have a given size in the longitudinal direction of the web,
wherein an integer number M of pages are arranged on a sheet in the longitudinal direction of the web, and
wherein an integer number N of pages from more than one sheet, N being larger than M, are imposed into one printing frame which is larger in the longitudinal direction of the web than the sheet format but not larger than the maximum printing format.

* * * * *